United States Patent [19]

Frazee

[11] 4,018,298
[45] Apr. 19, 1977

[54] WHEEL ASSEMBLY WITH SLIP CLUTCH

[75] Inventor: Ray D. Frazee, Shelbyville, Ind.

[73] Assignee: Carlisle Corporation, Cincinnati, Ohio

[22] Filed: Oct. 23, 1975

[21] Appl. No.: 624,864

[52] U.S. Cl. .................................. 180/76; 192/54; 301/1
[51] Int. Cl.² ........................................ B60K 23/06
[58] Field of Search ............ 180/76; 301/1; 192/54

[56] References Cited

UNITED STATES PATENTS

| | | | |
|---|---|---|---|
| 659,222 | 10/1900 | Foster | 180/76 |
| 1,141,839 | 6/1915 | Settergren | 180/76 X |
| 1,438,051 | 12/1922 | Moakler | 180/76 X |
| 2,226,759 | 12/1940 | Fitzner | 180/76 |
| 2,714,935 | 8/1955 | Papp | 180/76 |
| 2,855,062 | 10/1958 | Arentzen | 180/76 X |
| 3,207,251 | 9/1965 | Putnam | 180/76 |

FOREIGN PATENTS OR APPLICATIONS

| | | | |
|---|---|---|---|
| 1,269,806 | 7/1961 | France | 301/1 |
| 11,249 | 5/1913 | United Kingdom | 180/76 |

Primary Examiner—Joseph F. Peters, Jr.
Assistant Examiner—John P. Silverstrim
Attorney, Agent, or Firm—Jenkins, Hanley & Coffey

[57] ABSTRACT

Wheel and axle assembly for a small vehicle such as a riding lawnmower which includes a frame and an engine mounted upon the frame, the assembly comprising an axle having opposite first and second ends journalled mounted upon the frame for rotation and drivingly connected to the output of the engine conventionally through a transmission. First and second wheels are provided for mounting, respectively, on the first and second axle ends. The first wheel is rigidly connected to the first axle end for rotation with the axle such as by pinning or by a key. A torque-limited driving connection is provided between the second wheel and the second axle end, the torque-limited driving connection permitting relative rotation between the second wheel and axle when a predetermined torque level is exceeded. This torque-limited device may include a frictional drive connection between the second wheel and the axle. The second wheel may include a rim housing journalled mounted on the second axle end for rotation relative to the axle, and a friction clutch for drivingly connecting the rim housing to the axle. The clutch may include a clutch plate mounted on the second axle end for rotation with the axle and friction pads for engaging the plate, the pads being carried by the rim housing.

5 Claims, 3 Drawing Figures

WHEEL ASSEMBLY WITH SLIP CLUTCH

The present invention relates to wheel and axle assemblies for small vehicles such as riding lawnmowers, and more particularly to the provision of such a wheel and axle assembly in which one of the two wheels is drivingly connected to the axle by a torque-limited driving connection means permitting relative rotation of that wheel and the axle when a predetermined torque level is exceeded.

Conventionally, for riding lawnmowers, the rear wheels are driven from the engine and transmission through a differential gear assembly which permits the mower to be steered as a result of relative rotation between the ground wheels. Such an assembly is relatively expensive. Further, it is now desired to have at least one of the two rear wheels fixed against rotation relative to the rear axle and the sprocket on the rear axle which is connected by a chain to the transmission. Thus, when a brake is applied to the output shaft of the transmission, the one rear wheel is necessarily stopped.

A differential action, however, is provided, in accordance with the present invention, by having the other rear wheel drivingly connected to the rear axle by means of a torque-limited drive connection such as, for instance, a slip clutch.

Reference is made to U.S. Pat. No. 849,474 issued Apr. 9, 1907; U.S. Pat. No. 906,017 issued Dec. 8, 1908; U.S. Pat. No. 2,566,724 issued Sept. 4, 1951; U.S. Pat. No. 2,832,452 issued Apr. 29, 1958; and U.S. Pat. No. 2,943,466 issued July 5, 1960. In addition, particular reference is made to U.S. Pat. No. 3,207,251 issued Sept. 21, 1965 and U.S. Pat. No. 3,289,800 issued Dec. 6, 1966, both showing friction-type differential assemblies replacing conventional gear differential assemblies. Both U.S. Pat. Nos. 3,207,251 and 3,289,800 show two piece axles, i.e., axles which are separated into two axle halves with one wheel rigidly connected to each half.

The present invention constitutes an improvement over the prior art in that one of the two wheels is rigidly connected to the one-piece axle so that it necessarily rotates with the axle and with the drive sprocket arrangement on the axle while the other wheel slips on the axle or rotates relative to the axle when a predetermined torque, for instance, 35 foot pounds is exceeded. In this application and in the claims, the term "one-piece" is intended to refer to the type of axle having opposite ends connected for movement together.

One advantage of the wheel assembly of the present invention involves the ease with which the wheel assembly is installed in the factory which assembles the small vehicle. Particularly, a one-piece axle is provided which is rather easy to assemble on the vehicle using conventional bearing blocks, this axle having first and second opposite ends. A first wheel is rigidly connected to the first axle end for rotation therewith using a conventional key or pin. Then, the second wheel is slipped onto the second axle end and secured thereon also by conventional means such as a pin, snap ring or the like. The second wheel, itself, is a completed assembly including a rim housing which rotates on the axle and a slip clutch including a clutch plate which is mounted on the second axle end for rotation with the axle. This clutch plate is held in the rim housing by the friction means so that it is in concentric alignment with the wheel to be conveniently slipped on to the axle.

An object of the present invention, therefore, is to provide such a wheel axle assembly in which the improvement comprises means for rigidly connecting the first wheel to the first axle end for rotation therewith, the second wheel including a rim housing journalled mounted on the second axle end for rotation relative to the axle, a plate attached to the axle for rotation therewith adjacent the rim housing, and means for providing a torque-limited driving connection between the plate and the rim housing. This torque-limited connecting means permits relative rotation between the second wheel and the axle when a predetermined torque level is exceeded.

The rim housing, which is journalled mounted on the second axle end for rotation relative to the axle, may preferably include a friction clutch means for drivingly connecting the rim housing to the axle. This clutch means may include a clutch plate mounted on the second axle end for rotation therewith and friction pad means for engaging said plate, the pad means being carried by the rim housing.

The rim housing may include a rim flange conventionally supporting the rubber tire, the flange having a concentric central portion, and a shell member attached to the central portion and defining with the central portion a space in which the clutch plate is disposed, the frictional engaging means acting between the central portion and the shell member. The frictional engaging means may include first friction pad means for engaging one side of the plate and second friction pad means for engaging the opposite side of the plate, and spring means for yieldably urging the second pad means against the plate, the plate being axially shiftable on the axle to accommodate the action of the pad means.

Other objects and features of the present invention will become apparent as this description progresses.

Figure 1:
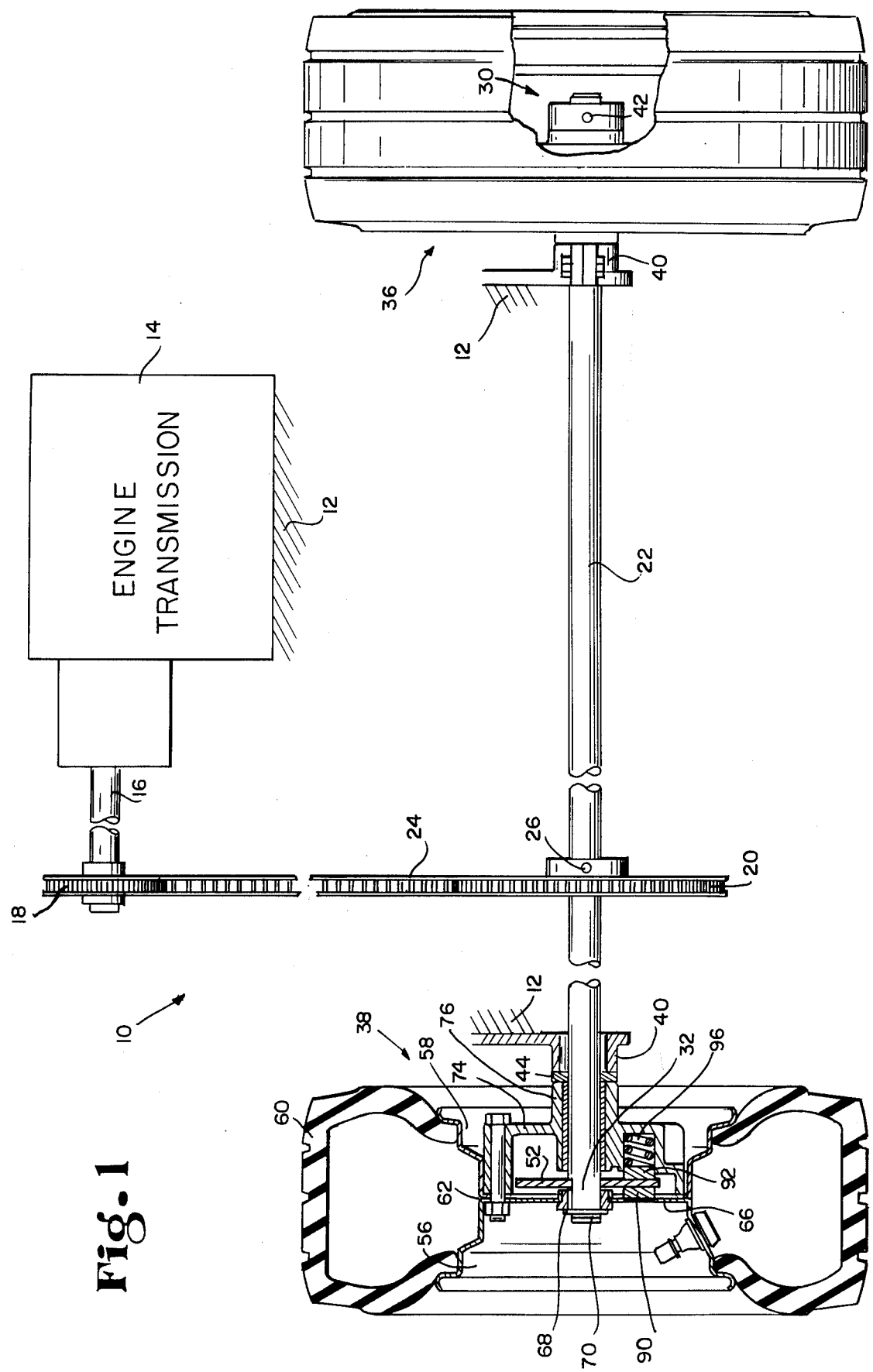
FIG. 1 is a fragmentary, partially sectioned, view of the wheel and axle assembly showing portions of the vehicle frame and diagrammatically showing the engine and transmission.

The assembly 10 is shown comprising portions 12 of the vehicle frame upon which the engine and transmission 14 are mounted to provide an output shaft 16 upon which conventionally a sprocket 18 is mounted. A sprocket 20 is mounted upon the rear axle 22 which is journalled mounted in the frame 12, and the two sprockets are drivingly connected by means of a chain 24. The sprocket 20 is conventionally pinned to the axle 22 as shown at 26. The one-piece axle 22 has first and second opposite ends 30, 32 upon which first and second wheels 36, 38 are mounted. Bearing blocks 40 are shown attached to the frame portions 12 for supporting the axle 22 for rotation. The first wheel 36 is pinned as indicated at 42 to the first axle end 30 so that the wheel 36 necessarily rotates with the axle 22 and sprocket 20.

Referring to the second wheel 38, it will be seen that a bearing washer 44 is disposed between that wheel and the bearing block 40. In the illustrative embodiment, at least one flat 50 is machined on the second axle end 32, and a clutch plate 52 having a center opening with a corresponding flat is mounted upon the second axle end. It will be appreciated that the clutch plate 52 rotates with the axle 22. It will further be appreciated that any number of techniques may be utilized to mount the clutch plate 52 on the axle 22 for rotation therewith. For instance, a conventional keyway and key arrangement may be used drivingly to connect the clutch plate 52 to the axle.

The wheel 38 includes a rim housing indicated generally at 53 which, in the illustrative embodiment, includes a rim flange bearing 54 at the distal end portion of the second axle end 32, an outer rim flange 56 and an inner rim flange 58 welded together in conventional fashion to provide an annular support for the rubber tire 60. Conventionally, the two flanges are welded together about the peripheral connection 62 to provide a seal for the tire air chamber. The radially inner portion of the outer rim flange 56 is formed as indicated at 64 to provide an axially short sleeve mounted upon the bearing 54. The connected rim flanges, therefore, define a concentric central portion 66 which serves as a portion of the clutch housing as will be described hereinafter. The wheel 38 may be retained on the axle 22 by means such as the illustrated washer 68 and lock ring 70. Any number of such conventional retaining means may be used to secure the wheel 38 on the axle 22.

In the illustrative embodiment, a concentric shell member 74 provides a concentric, axially extending sleeve portion 76 having an axial bore 78 therein receiving a bearing 80 which is sleeved on the second axle end 32. This shell member 74 is rigidly and concentrically secured to the central portion 66 to become a part of the rim housing 53. Illustratively, the shell member 74 is provided with four axially extending, peripherally spaced apart bolt openings 82 in registry with bolt openings 83 in the central portion 66, and bolts 84 extend through these bolt openings. Nuts 86 are threaded onto the bolts 84.

Figure 2:
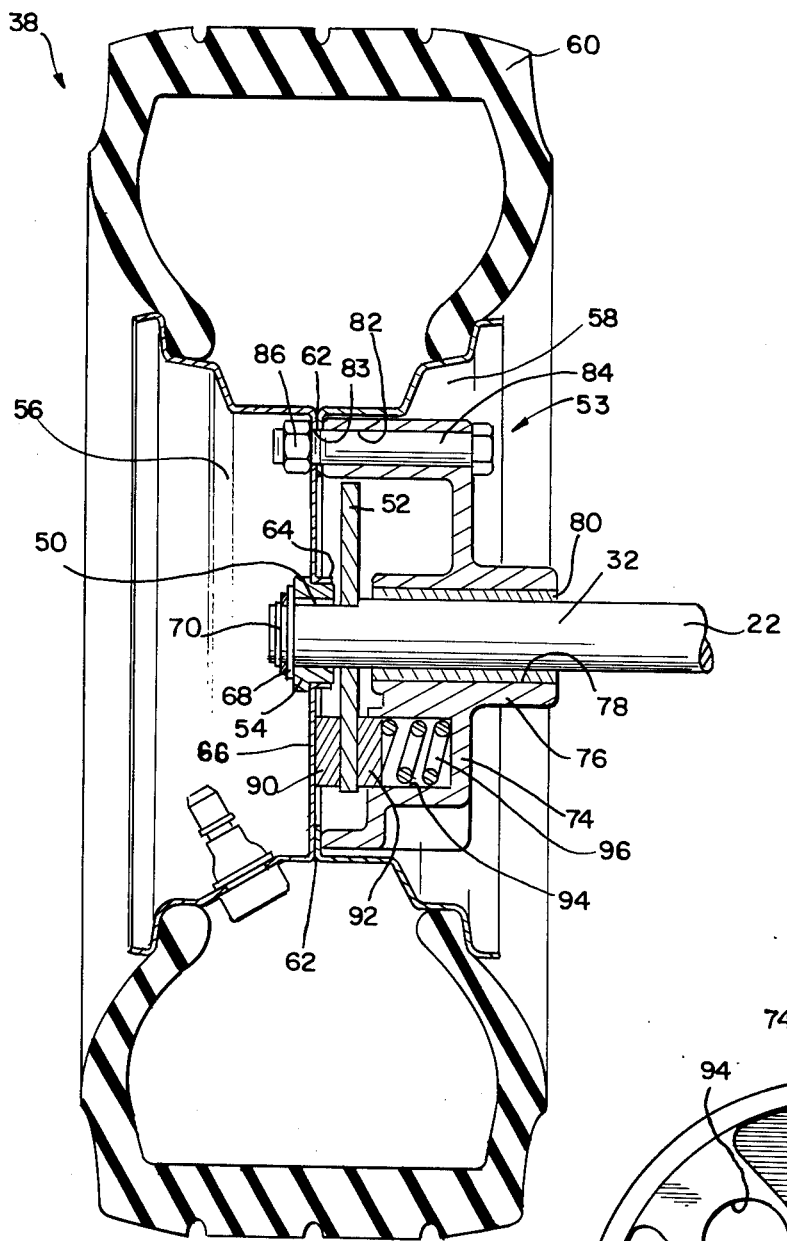
FIG. 2 is an enlarged view of the wheel and slip clutch assembly at the left-hand end of the axle in FIG. 1.
Figure 3:
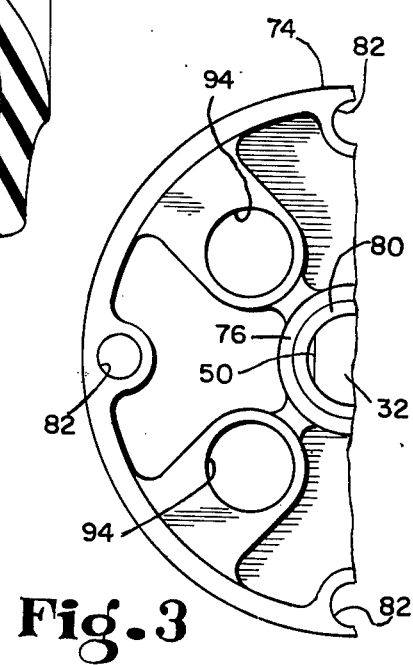
FIG. 3 is a fragmentary end view, partially sectioned, looking axially inwardly at the shell member for the friction clutch arrangement shown in FIG. 2.

Four peripherally spaced apart friction pads 90 are carried by the central portion 66 to engage the axially outer side of the clutch plate 52 and four peripherally spaced apart friction pads 92 are carried by the shell member 74 to engage the axially inner side of the clutch plate 52. In the illustrative embodiment, the shell member 74 is provided with four equally peripherally spaced, axially outwardly opening bores 94 receiving compression springs 96. The pads 92 are received telescopically in the bores 94 and are urged axially outwardly by the springs 96 into engagement with the clutch plate 52. It will be appreciated from FIG. 2 that the clutch plate 52 is slightly axially shiftable on the axle end 32 to accommodate the spring pressure. The springs 96, of course, are loaded to a predetermined degree by tightening the nuts 86 on the bolts 84 to secure the shell member 74 to the central flange portion 66.

Before the wheel 38 is mounted upon the axle 22, the rim housing assembly is completed and the clutch plate 52 is secured in concentric relationship with the bearings 80, 54 by the engagement of the friction pads 90, 92. It will be appreciated that the shell member 74 may be formed such that radially inwardly extending abutments in the shell member will keep the clutch plate 52 substantially centered. Thus, the wheel 38 is mounted upon the axle 22 as a complete assembly with the springs 96 already preloaded.

I claim as my invention:

1. Wheel and axle assembly for a small vehicle such as a riding lawnmower including a frame and an engine mounted upon said frame, said assembly comprising an axle having opposite first and second ends, means for journal mounting said axle for rotation on said frame, means for drivingly connecting said engine to said axle, first and second wheels for mounting, respectively, on said first and second axle ends, in which the improvement comprises means for rigidly connecting said first wheel to said frist axle end for rotation therewith, said second wheel including a rim housing journal mounted on said second axle end for rotation relative to said axle, said rim housing including a rim flange having a concentric central portion and a shell member adjacent said central portion and defining with said central portion a space, and means for fastening said shell member to said central portion, a plate within said space attached to said axle for rotation therewith, said plate having opposite sides and being axially shiftable on said axle, and means for providing a torque-limited driving connection between said plate and said rim housing, said torque-limited connecting means permitting relative rotation between said second wheel and said axle when a predetermined torque level is exceeded, said torque-limited connecting means including a plurality of first friction pads carried by said flange central portion and engaging one side of said plate and a plurality of second friction pads carried by said shell member and engaging the opposite side of said plate, and spring means for urging said second pads against said plate, said fastening means being operative to preload said spring means.

2. Wheel and axle assembly for a small vehicle such as a riding lawnmower including a frame and an engine mounted upon said frame, said assembly comprising an axle having opposite first and second ends, means for journal mounting said axle for rotation on said frame, means for drivingly connecting said engine to said axle, first and second wheels for mounting, respectively, on said first and second axle ends, in which the improvement comprises means for rigidly connecting said first wheel to said frist axle end for rotation therewith, said axle being a one-piece axle, said second wheel including a rim housing journal mounted on said second axle end for rotation relative to said axle, and friction clutch means for drivingly connecting said rim housing to said axle, said clutch means being operatively connected to provide a torque-limited driving connection between said rim housing and said axle, said clutch means including a clutch plate mounted on said second axle end for rotation with said axle and means for frictionally engaging said plate, said frictional engaging means being carried by said rim housing, said rim housing including a rim flange, said flange having a concentric central portion, and a shell member attached to said central portion and defining with said central portion a space in which said clutch plate is disposed, said frictional engaging means acting between said central portion and said shell member, said plate having opposite axial sides and being axially shiftable on said axle, said frictional engaging means including first friction pad means for engaging one side of said plate, second friction pad means for engaging the opposite side of said plate, and spring means for yieldably urging said second pad means against said plate, said spring means including compression springs held in compression by the attachment of the shell member to said central portion.

3. The improvement of claim 2 in which said first pad means is carried by said flange central portion and said second pad means is carried by said shell member.

4. The improvement of claim 2 in which said shell carries a concentric, axially extending bearing receiving said axle and journal mounting said second wheel on said axle.

5. The improvement of claim 2 in which said shell member is rigidly attached to said rim flange and said clutch plate is positioned and held in concentric alignment by said frictional engaging means so that said second wheel is mountable upon said second axle end as a completed assembly.

* * * * *